United States Patent [19]

Bettcher

[11] E Patent Number: Re. 32,592

[45] Reissued Date of Patent: Feb. 9, 1988

[54] PRODUCT PUSHER FOR CUTTING APPARATUS

[75] Inventor: Louis A. Bettcher, Amherst, Ohio

[73] Assignee: Bettcher Industries, Inc., Birmingham, Ohio

[21] Appl. No.: 893,578

[22] Filed: Aug. 5, 1986

Related U.S. Patent Documents

Reissue of:

[64] Patent No.: 4,463,643
Issued: Aug. 7, 1984
Appl. No.: 386,807
Filed: Jun. 9, 1982

U.S. Applications:

[63] Continuation-in-part of Ser. No. 172,657, Jul. 28, 1980, Pat. No. 4,334,451.

[51] Int. Cl.[4] ..... B26D 7/01

[52] U.S. Cl. ..... 83/703; 83/409.2; 83/411 A; 83/437

[58] Field of Search ..... 83/437, 411 A, 355, 83/356.3, 703, 409.2, 109

[56] References Cited

U.S. PATENT DOCUMENTS

| | | | |
|---|---|---|---|
| 659,683 | 10/1900 | Long | 83/356.3 |
| 1,359,362 | 11/1920 | Gulla | 83/437 |
| 1,422,937 | 7/1922 | Dorcheff | 83/437 |
| 1,442,889 | 1/1923 | Kirnbauer | 83/437 |
| 2,234,432 | 3/1941 | Gallo . | |
| 3,782,230 | 1/1974 | Bettcher | 83/411 A X |

*Primary Examiner*—Frank T. Yost
*Attorney, Agent, or Firm*—Watts, Hoffmann, Fisher & Heinke

[57] ABSTRACT

An improved product pusher for a cutting apparatus. The pusher slides downward along an upright receptacle to urge a comestible product, such as meat through a magazine movable past a cutter of the apparatus. The pusher has a catch for automatically retaining it at an upper end of the receptacle to facilitate loading the magazine. It also has two bottom surface portions with product engaging projections. In one arrangement the two surface portions are in a fixed angular relationship and a spring-biased stripper plate is beneath one of the surface portions, extending in a common plane with the other surface portion. In another arrangement the two surface portions are relatively pivoted and securable in either an angular relationship or co-planar.

17 Claims, 22 Drawing Figures

PRODUCT PUSHER FOR CUTTING APPARATUS

Matter enclosed in heavy brackets [ ] appears in the original patent but forms no part of this reissue specification; matter printed in italics indicates the additions made by reissue.

RELATED APPLICATION

This application is a continuation-in-part of copending application Ser. No. 172,657 filed July 28, 1980, entitled Improved Cutting Apparatus, now U.S. Pat. No. 4,334,451.

DESCRIPTION

1. Technical Field

This invention relates to cutting apparatus for severing slices from a comestible product or workbody; especially meat bodies, including frozen products and those having bones. More particularly, it relates to an improved product pusher for a rotary magazine that carries comestible products past a slicing knife.

2. Background Art

Cutting apparatus of the general type to which this invention relates is shown in U.S. Pat. Nos. 3,434,519; 3,587,689; 3,693,684; 3,782,230; 3,831,475; and 3,985,057. The apparatus disclosed therein moves a product carried by a receptacle in an endless horizontal path past a cutter, which severs sections from the product. Advantageously, the receptacle has an inclined interior surface that directs the product downward into cutting position in response to rotational force and rearward to minimize any tendency of the product to move upward during the severing operation. The receptacles are upright tubular or trough-like affairs secured at a lower end to a base, as by welding or with screws. The base is driven from a central supporting shaft and has openings in line with the receptacles, through which the product passes.

Relatively heavy product pushers are located within and slide along the receptacles. Each pusher rests on the upper end of a product to urge it downward through the magazine, into the path of the cutter. During loading, each pusher must be raised with one hand and held while a product is inserted into the receptacle with the other hand. It is particularly difficult to load heavy pieces of meat, which may weigh up to 50 pounds, with one hand.

At the present time, different pushers are used for different products. For example, frozen pork loin has a bone, a sloped upper end, and is small in width, which allows it to be completely received within the receptacle, but which requires that it be held against tipping. As a result, a pusher is used having an inclined transverse surface and extending tines or cleats to grip the upper end of the product. When the product has been sliced, the end or heel piece must be removed from the tines. On the other hand, pieces of large fresh meat to be cut are usually greater in width than the receptacle, extend laterally through and beyond an open side thereof, and require a larger and flat pushing surface. This need for different pushers results in extra equipment expense, handling, and storage space.

DISCLOSURE OF THE INVENTION

The present invention provides new and improved product pushers for cutting apparatus used for severing slices from a comestible product.

The improved product pushers are constructed for movement along a guide of an upright receptacle that forms a part of a magazine that moves a comestible product past a cutter. The pushers each have a body that moves along the guide, and a surface that moves with the body, extends transversely of the guide, and engages the upper end of the product. The body carries a catch that engages the receptacle and prevents downward movement along the guide when the body is in a raised position. This allows an operator to raise the pusher and then use both hands to position a product in a receptacle, beneath the pusher. A mechanism on the body is manually operable to release the catch and permit downward movement of the body by gravity to urge the product through the magazine. The release mechanism is constructed to facilitate operation with one hand. Thus, the operator can release and lower the pusher into contact with the product with one hand while retaining the product in the receptacle with the other hand until the pusher engages the top surface.

In a preferred construction the transverse surface has two angularly related portions and a flat member that extends beneath one of the portions and generally in the plane of the other portion. The flat member can be moved against a yieldable biasing force toward the overlying surface portion. It has openings that receive tines or cleats extending from the overlying transverse surface portion. In use, the weight of the pusher exerts a force against a product through the transverse surface and the underlying flat member. When a product underlies only the flat member, the weight of the pusher overcomes the yieldable biasing force and the flat member moves from its spaced location to a position against the overlying angular transverse surface, exposing the tines or cleats. Upon removal of the pushing force, as when the pusher reaches a lowered position where it is stopped by the magazine base, the biasing force moves the flat member away from the transverse surface so the flat member acts as a stripper plate to remove the remaining product from the pusher tines. This advances the remaining product toward the cutting blade, allowing additional slices to be cut. With this construction, large and small products can be effectively pushed with a single product pusher. A pork loin, for example, with a small cross-section and inclined upper end can be received beneath only the yieldably biased flat member and its overlying inclined transverse surface. This results in the flat member being pushed against the overlying transverse surface, oriented at an angle that is compatible with the end surface of the product and that resists tipping of the product, permitting engagement of the cleats or tines that also help retain the pork loin against tipping. Yet, when a large product with a flat, level, upper end is received in the receptacle, the extended flat member and the other transverse surface portion, which lie in a common plane, overlie and rest against the larger top surface of the product and urge it downward. Typically, the cleats or tines, which remain recessed behind (i.e., above) the flat member or stripper plate, are not required for larger more stable products and tines on the other transverse surface portion adequately hold the product.

A modified embodiment provides projecting grippers on the biased flat plate to aid in gripping the product when the tines remain recessed. It also has a stop member operable to selectively prevent the flat member from being forced out of the common plane and against the overlying angularly related surface. This permits force to be more uniformly applied against a large product having a flat top surface.

A further embodiment provides a two-piece transverse surface, one piece being pivoted relative to the other between a first position in a common plane and a second position angularly related, to form a surface similar to that of the fixed portions of the previously described embodiment. This provides a strong and more rigid transverse surface in a common plane than does the yieldably biased flat member and accommodates the same variety of products. Moreover, if desired, it can be used with a stripper plate of the construction described.

The above and other features and advantages of the invention will become better understood from the detailed description that follows, when considered in connection with the accompanying drawings.

BEST MODE FOR CARRYING OUT THE INVENTION

Figure 1:
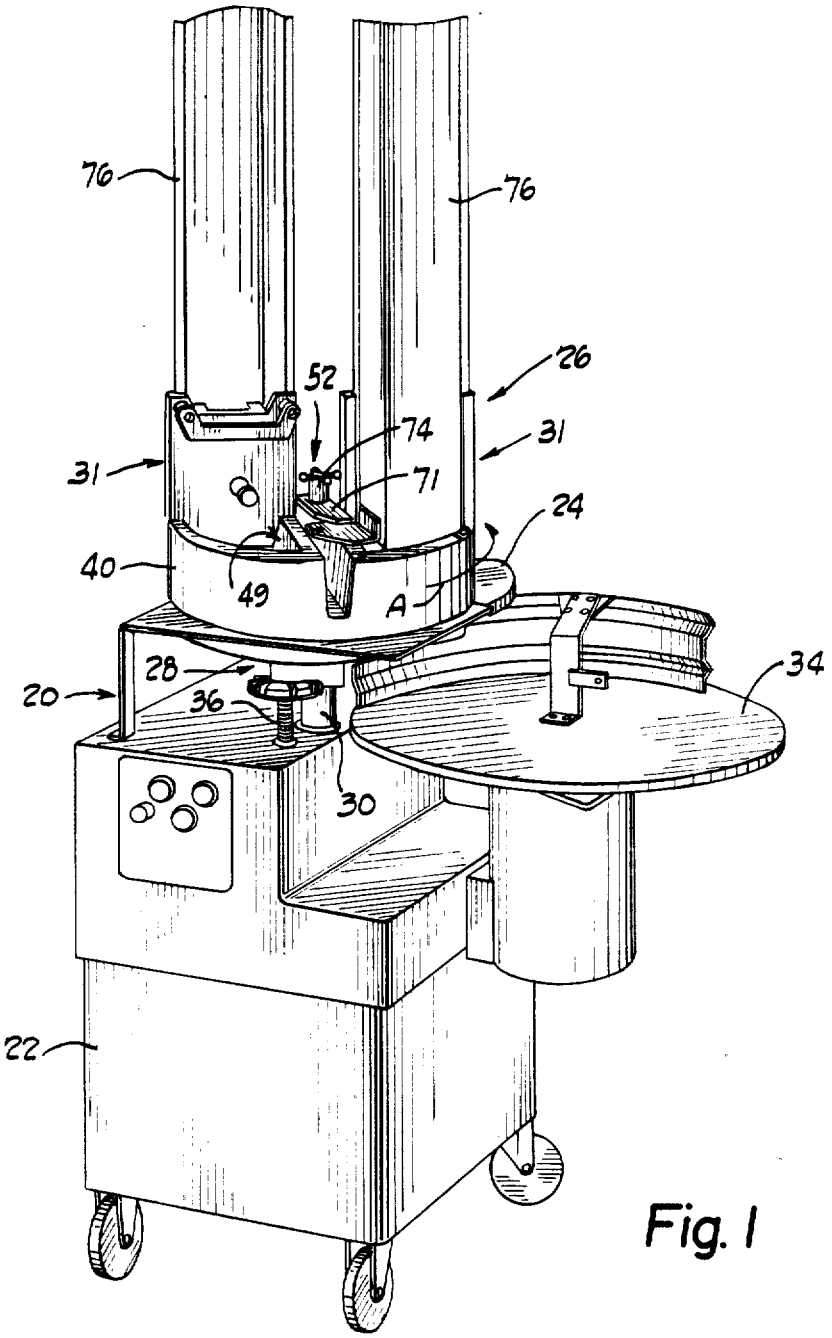
FIG. 1 is a perspective view of a cutting apparatus embodying the present invention.

Referring to the drawings, a cutting apparatus embodying this invention is shown in FIG. 1, indicated generally by the reference numeral 20. The apparatus includes a wheeled stand 22 having a horizontally disposed, vertically adjustable, table 24; a rotatable magazine assembly 26 disposed above the table 24 and rotatably supported for moving one or more products through an endless path; and a rotary knife assembly 28 supported by the stand 22 and located partially in an opening or recess in the table 24. The magazine assembly 26 is carried on a vertical shaft 30, is open at the bottom, and moves products to be sliced across the rotary knife assembly 28. Product pushers 31 carried by the magazine assembly urge the products to be sliced through the magazine. The knife assembly has a disc-shaped horizontal blade that severs a slice or section from a product as it is moved by the magazine assembly. The slice is received on a rotatable table 34 secured to the stand 22. For safety, the blade is covered by a guard.

The table 24 supports the bottom end of products moved by the magazine assembly and is adjustable in height relative to the rotary knife assembly 28 to change the thickness of slices to be severed from the product. This adjustment is accomplished by an adjusting wheel and screw 36. The relationship between the knife blade and magazine, the manner in which they are driven, and other ways of adjusting the table height, are all shown in the above-mentioned patents, which are hereby incorporated by reference.

The magazine assembly 26 includes a circular base 40 of molded plastic that provides two spaced, tubular, product-receiving passages 49, 50 diametrically across from each other and a central hub portion 52. The upper end of the central hub portion 52 has a rectangular slot for facilitating a driving connection between the shaft and base, through a clamp plate 71, to transmit rotary motion. A threaded stud extends from the top of the shaft 30 to receive a clamp knob 74 that acts against the plate 71 to retain the base on the shaft.

Two trough-like receptacles 76 are supported in an upright position, one in each passage 49, 50, at diametrically opposite ends, so that each is at the back end of its passage relative to the direction of rotation of the base across the knife, indicated by the arrow A in FIG. 1.

Each receptacle 76 is formed of stainless steel sheet metal, of uniform cross section, and shaped to conform to the end of the receiving passage. A lower end of each receptacle is partially telescoped within the receiving passage, resting against a tapered wall portion.

Figure 2:
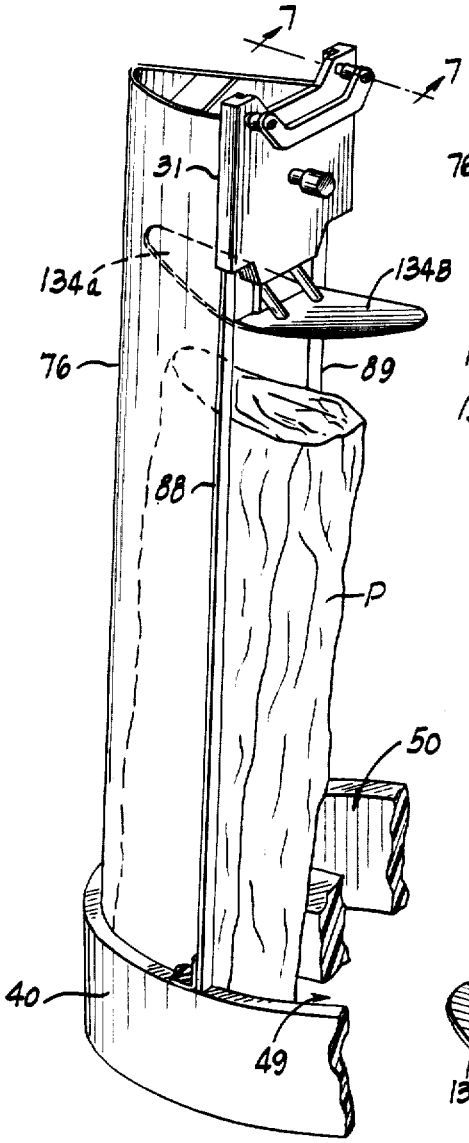
FIG. 2 is a partial perspective view of a rotary magazine of the apparatus of FIG. 1 showing a product pusher embodying the present invention.

As best shown in FIG. 2, parallel flanges 88, 89 of each receptacle extend outwardly from the open side in a common plane and support a product pusher 31 that slides up and down on the receptacle and serves to urge a product P retained in the receptacle in a downward direction to facilitate slicing. The flanges end at the top of the base, as best illustrated in FIG. 2.

The two product pushers 31 of FIG. 1 are identical and one is shown in detail in FIGS. 3–8. The pusher 31 has a bottom plate 134 for engaging the top of a product in the receptacle and has an upright support 138 secured to the bottom plate. Braces 140 extend between the two for rigidity. The pusher also has a plastic slide 142 with inwardly facing grooves 144, 145 that receive the flanges 88, 89 of the respective receptacle, and guide the assembly in sliding movement along the receptacle. The slide 142 and support 138 are held together with a screw 147 of an outwardly extending handle 148, the screw extending through the slide and being received in a threaded aperture 149 of the support 138. The handle is used to raise the pusher to an upper position shown in FIG. 2 when a product is inserted into the receptacle. The weight of the assembly then bears against a top surface of a product and urges it downward and in some cases inward toward the back of the receptacle.

The bottom plate 134 has two flat angularly related portions 134a, 134b extending in opposite directions from the upright support 138. The portion 134a is of size to fit within a receptacle 76, extends in a direction into the receptacle in use, and forms an acute angle with the upright support 138. The portion 134b extends at a right angle to the support 138 in a direction away from the receptacle, and is of a size to fit within the passages 49 and 50 of the magazine base, as is apparent from FIGS. 1 and 2. Two rows 155, 156 of cleats or tines extend from the bottom surface of plate portion 134a and three rows 157, 158 and 159 extend from the bottom surface of the portion 134b. These cleats or tines serve to pierce and retain the product in an upright position within the receptacle.

Figure 3:
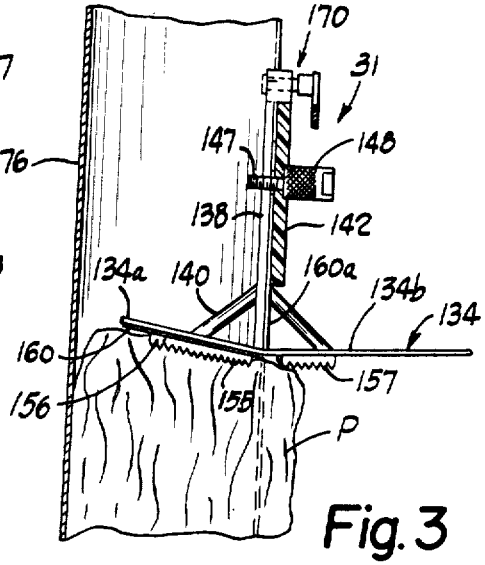
FIG. 3 is a partial sectional view of a product receptacle and the follower of FIG. 2.
Figure 4:
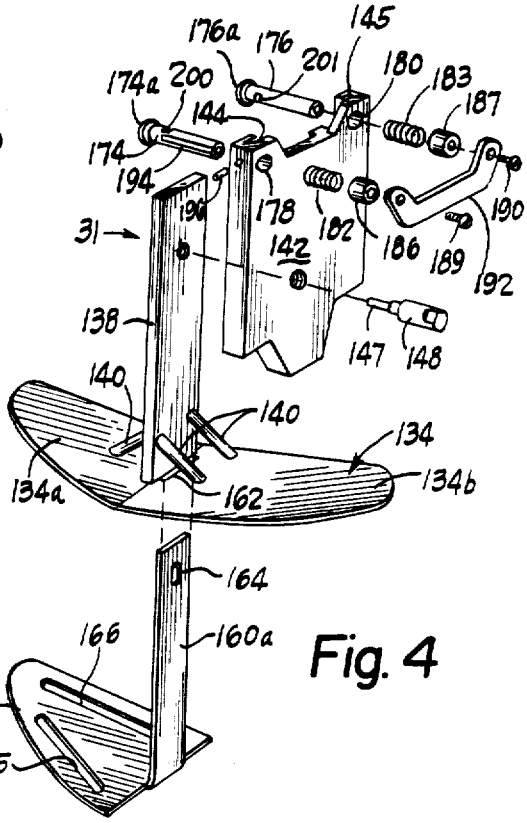
FIG. 4 is an exploded perspective view of the product follower of FIG. 2.
Figure 5:
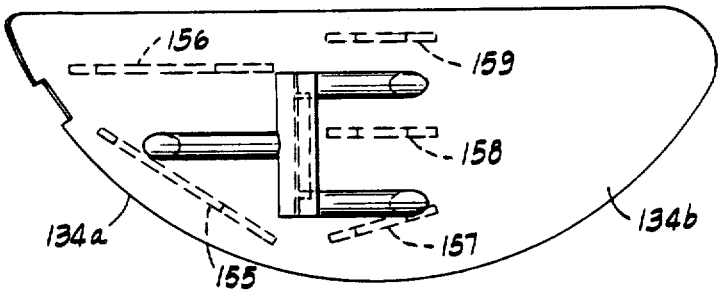
FIG. 5 is a top plan view of the follower of FIG. 2 with parts removed.
Figure 6:
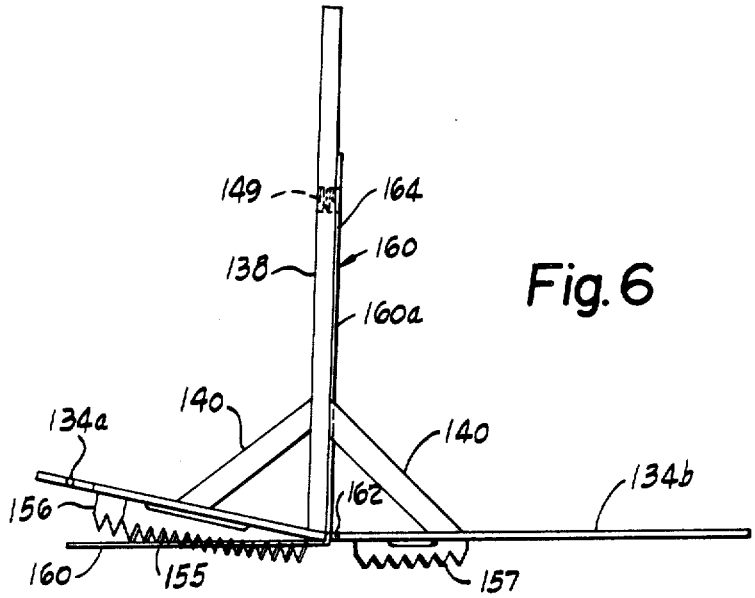
FIG. 6 is a side elevational view of the follower of FIG. 2 with parts removed.
Figure 7:
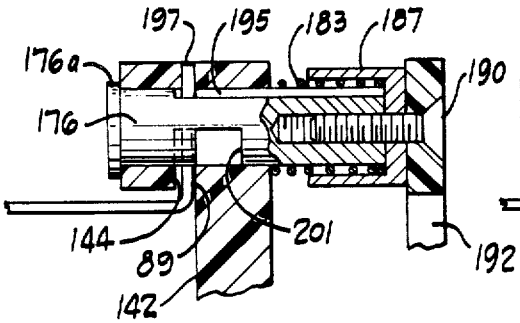
FIG. 7 is a partial sectional view with parts in elevation of the follower of FIG. 2 taken along the line 7—7, showing the catch mechanism in a closed or latching position.

A flat stripper plate 160 extends beneath the plate portion 134a at a right angle to the upright support 138 and essentially in the plane of the plate portion 134b. The stripper plate has an elongated integral support portion 160a that extends at a right angle and is positioned against the upright support 138, extending through an open slot 162 in the plate portion 134b at the base of the upright support. An aperture 164 in the support portion 160a receives the screw 147 of the handle 148 and is elongated in a direction to allow the stripper plate support portion 160a to be adjusted a short distance longitudinally to move the stripper plate toward and away from the bottom plate 134. The support portion 160a is clamped in place between the upright support 138 and the slide 142 by the handle 148. The stripper plate is of spring metal and is yieldably pivoted relative to the support portion 160a when only the pusher portion 134a rests against a product, as illustrated in FIG. 3. Two slots 165, 166 (FIG. 4) receive the cleats or tines 155, 156, respectively when the stripper plate is biased against the bottom of the plate 134a. When the pusher is lifted after a product has been sliced, the plate portion 134a returns to the plane of the portion 134a, stripping any remaining heel of the product from the cleats. Also, when the product is large enough that the plate portion 134b is supported on the product, the stripper plate is spring biased to a parallel substantially co-planar position on the product.

A catch or latching mechanism 170 on the slide 142 serves to automatically hold the pusher at the top of the magazine when it is raised, until it is manually released, after which it rests against the top of the product P. The latching permits the operator to use both hands to place the product in the magazine and to then hold the product in place with one hand while releasing and lowering the product follower with the other.

Figure 8:
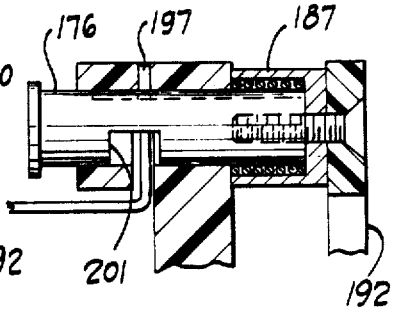
FIG. 8 is a partial sectional view similar to FIG. 8, showing the catch mechanism in a release position.

The latch mechanism 170 includes two pins 174, 176 (FIGS. 4, 7 and 8) axially movable in holes 178, 180 in the slide. The holes extend through the grooves 144, 145 so the pins block the grooves when in the position shown in FIG. 7, to which they are urged by compression springs 182, 183, movement being limited by heads 174a, 176a. The springs are retained within cups 186, 187 secured to the opposite end of each pin from the head by a screw 189, 190, respectively. The screws also attach an operating bar 192 to the cups and pins. A narrow longitudinal slot 194, 195 along each pin receives a guide pin 196, 197 located in the slide, to keep the pins 174, 176 from rotating. A transverse slot 200, 201 extends approximately half-way through the thickness of each pin, located to be within the thickness of the slide 142, displaced from the grooves 144, 145, when the springs 182, 183 hold the pins 174, 176 with their heads ajacent the slide (FIG. 7); and located to be aligned with the grooves when the springs are compressed and the cups 186, 187 are located against the slide (FIG. 8). Thus, when the pusher is at the top of a magazine, the pins will be in the position of FIG. 7 and will rest against the top edges of the associated magazine flanges 88, 89, holding the pusher in a raised position. When the pins are moved to the position of FIG. 8 by movement of the operating bar 192 toward the slide, they will then allow downward movement of the pusher. Once the pins 174, 176 move below the top edge of the flanges, the operating bar can be released and the pins will not interfere with sliding movement of the pusher. The pins 174, 176 can only return to a blocking position, which they do automatically, when the pusher is raised to position the pins above the flanges.

A second embodiment of a product pusher 200 is shown in FIGS. 9–15 of the drawings. This product pusher has a bottom plate 202 for engaging the top of a product P in a receptacle and has an upright support 204 secured to the bottom plate. Braces 206 extend between the two for rigidity. A plastic slide 208 secures the pusher to a receptacle by inwardly facing grooves 210, 211 that receive the receptacle flanges 88, 89. The slide 208 and support 204 are held together with a screw 214 of an outwardly extending handle 216, the screw extending through the slide and being received in a threaded aperture of the support.

The bottom plate 202 has two flat angularly related portions 202a, 202b extending in opposite directions from the upright support 204. The portion 202a fits within a receptacle and forms an acute angle with the upright support 204. The portion 202b extends at a right angle to the support 204 in the direction away from a receptacle and fits within the passages 49 and 50 of the magazine base. Two rows 218, 219 of cleats or tines extend from the bottom surface of the plate portion 202a and three rows 220, 221, 222 extend from the bottom surface of the plate portion 202b.

A flat stripper plate 226 extends beneath the plate portion 202a at a right angle to the upright support 204 and essentially in the plane of the plate portion 202b. It has an elongated integral support portion 226a that extends at a right angle and is positioned against the upright support 204, extending through an open slot 227 in the plate portion 202b. The stripper plate is adjustable in the same manner as the plate 160 of the previous embodiment and is of spring metal to yieldably pivot relative to the support portion when force is applied. Two slots 228, 229 in the stripper plate receive the rows of cleats or tines. Projecting circular flanges 230 on the stripper plate serve a similar function to the cleats or tines when the stripper plate is in the extended position shown in FIG. 9, in which the major portion of the rows 218, 219 of cleats are recessed.

Figure 10:
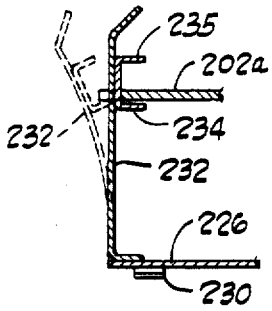
FIG. 10 is a partial sectional view taken along the line 10—10 of FIG. 9.
Figure 9:
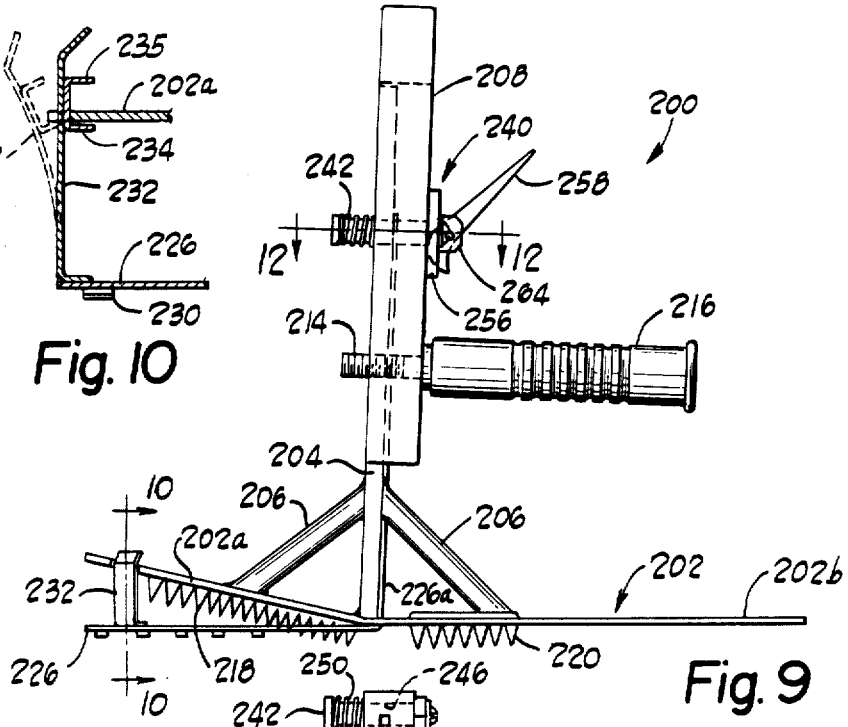
FIG. 9 is a side elevational view of another embodiment of a product pusher of the present invention.
Figure 11:
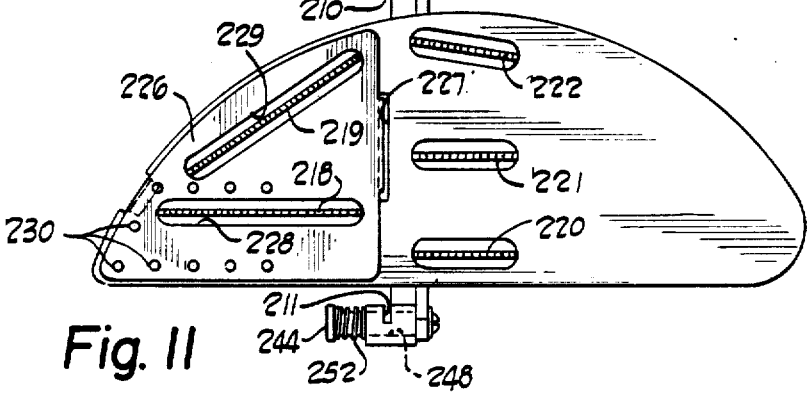
FIG. 11 is a bottom plan view of the pusher of FIG. 9.

A finger 232, shown in detail in FIG. 10, extends upwardly from the stripper plate adjacent a perimeter portion of the bottom plate 202a. It has two inwardly extending transverse parallel flanges 234, 235, relatively closely spaced, and positioned to straddle the bottom plate 202a. The two flanges engage the bottom plate to selectively hold the stripper plate against pivoting movement relative to the bottom plate, so that the stripper plate can act as a bottom plate in the plane of bottom plate portion 202b, when desired, as when a product has a relatively large and flat top surface. The finger 232 is yieldable and resilient and can readily be moved laterally outwardly of the position shown in FIG. 10 so the flanges 234, 235 clear the peripheral edge of the bottom plate 202a. The lower flange 234 can then be placed above the bottom plate 202a, allowing the stripper plate to pivot under applied force, to a position against the bottom of the bottom plate portion 202a, under the circumstances as illustrated in FIG. 3 in connection with the previous embodiment.

Figure 12:
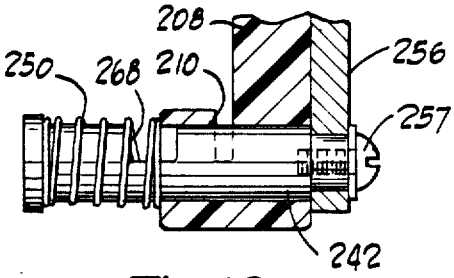
FIG. 12 is a sectional view with parts in elevation taken along the line 12—12 of FIG. 9 showing a catch for the pusher in a closed or latching position.
Figure 13:
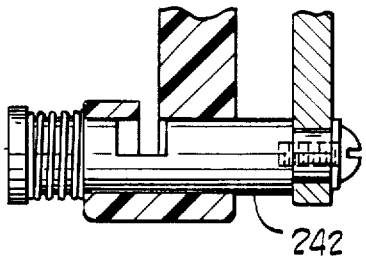
FIG. 13 is a view similar to FIG. 12 of the latch in an open or release position.
Figure 14:
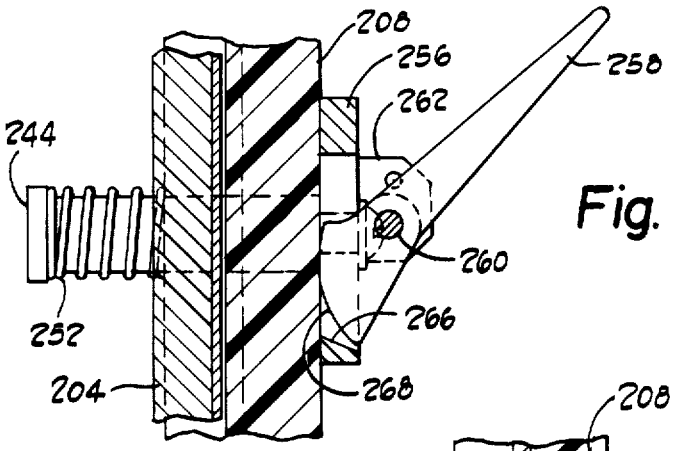
FIG. 14 is an enlarged partial view with parts in section showing the catch mechanism of FIG. 9 in a latching position.
Figure 15:
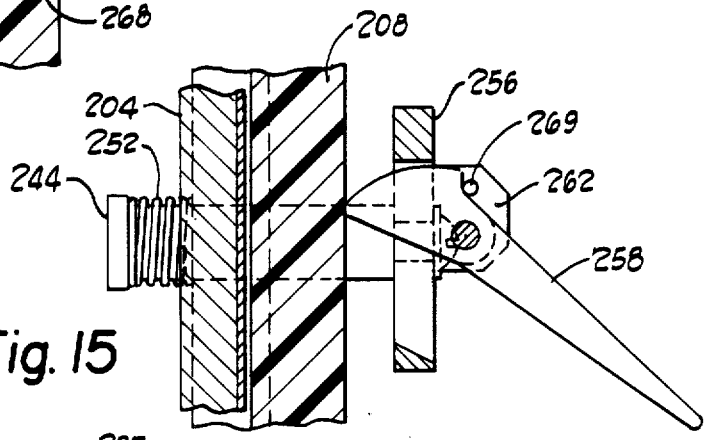
FIG. 15 is a view similar to FIG. 14 showing the mechanism in a release position.
Figure 16:
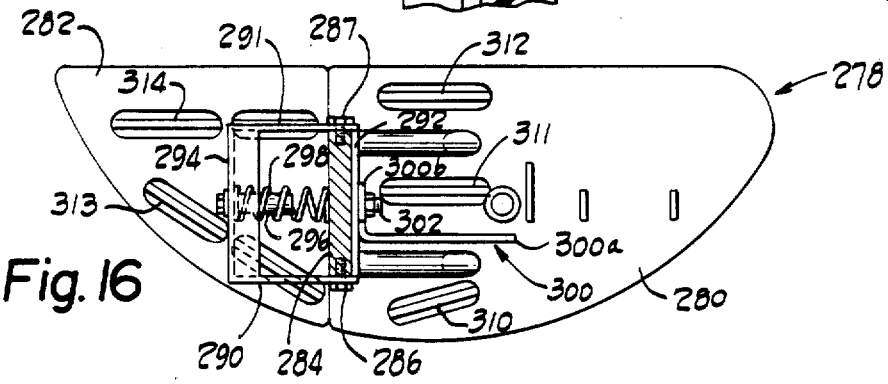
FIG. 16 is a top plan view partly in section of another embodiment of a product pusher.
Figure 17:
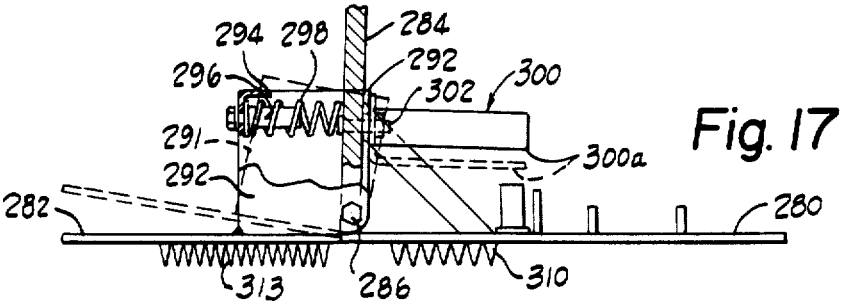
FIG. 17 is a side elevational view partly broken away and partly in section of the pusher of FIG. 16.

A catch or latching mechanism 240 on the slide 208 serves to automatically hold the pusher at the top of the magazine when it is raised, until it is manually released to rest against a top of a product. The mechanism includes two pins 242, 244 axially movable in holes 246, 248 in the slide. The holes extend through the grooves 210, 211 so the pins block the grooves when in the position shown in FIG. 12, to which they are urged by compression springs 250, 252, acting between a head of each pin and a face of the slide. A transverse connecting bar 256 on the opposite side of the slide from the springs is secured to the ends of the pins 242, 244, as by screws 257, restrains the pin movement by the springs, and carries an over-center lever or toggle 258 secured by a pivot pin 260 between ears 262, 264 extending from the connecting bar. The lever acts through a central opening 266 of the connecting bar, and a cam surface 268 of the lever acts against the face of the slide 208. When the lever 258 is moved from the position shown in FIG. 14 (in which the pins are as shown in FIG. 12) to the position shown in FIG. 15, it draws the connecting bar 256 away from the slide 208, compressing the springs 250, 252 and slides the pins 242, 244 axially to align slots 268 with the grooves 210, 211, as shown in FIG. 13, to permit lowering of the pusher. The lever 258 pivots to an over-center position and is retained under the force of the springs 250, 252, pivoting beyond the desired position of FIG. 15 being prevented by a stop 269 on the ear 262. The lever 258 is easily actuated by an operator with one finger, while holding the handle 216, by which the operator would then lower the pusher until it contacts the upper surface of a product in the magazine. Similarly, when a pusher is raised from a lowered position to the top of the magazine, the operator can merely flip the lever 258 upward from the FIG. 15 position to the FIG. 14 position and the pusher will be retained at the top of the magazine by the magazine flanges.

A further embodiment of a product pusher 278 is shown in FIGS. 16–22 of the drawings. This pusher provides a bottom plate of two pieces 280, 282. The piece 280 is integral with an upright support 284 and basically corresponds to the plate portion 134b and 202b of the previously described embodiments. The support 284 is secured to a slide, such as the slide 142 or 208. The plate 282 is pivoted to the support 284 adjacent the plate 280, by fasteners 286, 287. To facilitate this connection, two plate 290, 291 are fastened to an upper surface of the pivoted plate 282, perpendicular to the plate and located to closely straddle the upright support 284. A cross bar 292 extends between the two perpendicular plates and is positioned behind the upright support 284 (i.e., to the right in FIG. 17), to limit downward pivoting of the plate 282 beyond the plane of the plate 280. That is, downward pivoting is limited to the solid line position of FIG. 17. A second cross bar 294 is located in front of the upright 284, between the perpendicular plates 290, 291 and carries a pin 296 that extends toward the upright. The pin supports and guides a compression spring 298 that acts between the cross bar 294 and the upright support 284, biasing the pivoted plate 282 to the solid line position of FIG. 17, co-planer with the plate 280.

Figure 18:
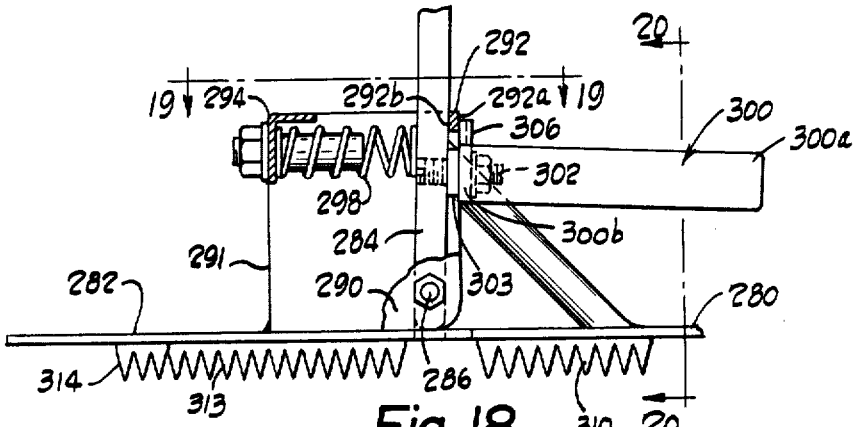
FIG. 18 is a partial enlarged view of the pusher of FIG. 17.

As best shown in FIGS. 18–22, an L-shaped latch member 300 is secured by a pivot bolt 302 to the upright 284 on the side from which the plate 280 extends. The latch member is located just below the cross bar 292 and is rotatable through at least 90°. It has a handle portion 300a that extends rearwardly from the upright support 284 and a keeper portion 300b parallel to and adjacent the upright support, but spaced therefrom by a washer 303 a distance substantially equal to the thickness of the cross bar 292. When the keeper portion 300b is in a vertical position, extending upward relative to the plate 280, it cooperates with the cross bar 292 to position the plate 282 in either its solid line position or phantom position of FIG. 17. Those positions are shown in detail in FIGS. 18 and 21. A front surface 304 of the keeper portion is inclined and a back surface 306 is flat and parallel to the cross bar 292. When the plate 282 is co-planer with the plate 280, as illustrated in FIG. 18, the handle 300a is rotated to bring the inclined surface 304 against the back surface 292a of the cross bar, forcing the cross bar into tight engagement against the back of the upright support 284 with a wedging action, which assures that the handle will remain in the rotated position and that the pivoted plate 282 will be rigidly retained in a co-planer position with the plate 280.

Figure 19:
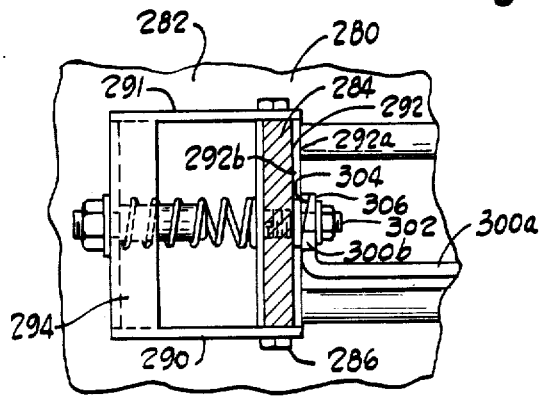
FIG. 19 is a view taken along the line 19—19 of FIG. 18.
Figure 20:
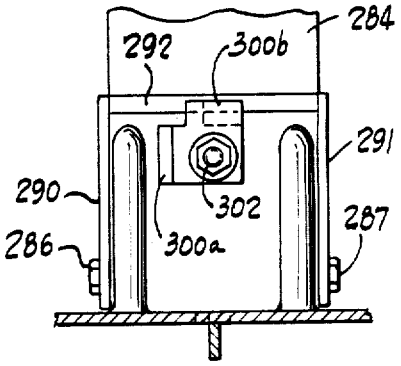
FIG. 20 is a view taken along the line 20—20 of FIG. 18.
Figure 21:
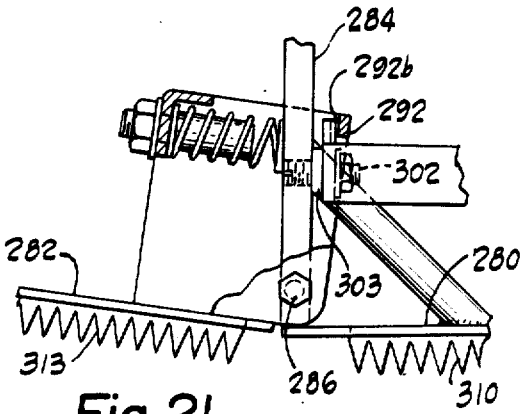
FIG. 21 is a side elevational view similar to FIG. 18 showing a part of the pusher in a pivoted position.
Figure 22:
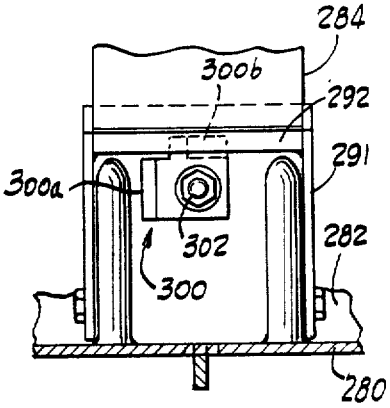
FIG. 22 is a view similar to FIG. 20 with a part in pivoted position as in FIG. 21.

If the handle is rotated 90° counterclockwise from the positions shown in FIGS. 18–20, the keeper portion 300b will be located beneath the cross bar 292 and the plate 282 can be pivoted to the position of FIG. 21. Rotation of the handle of the keeper 90° clockwise will then again position the keeper in a vertical upright location where the flat surface 306 will cooperate with a front surface 292b of the cross bar, holding the plate 282 in the phantom position against the biasing force of the spring 298. In its pivoted position, the plate 282 is equivalent to the plate portion 134a or 202a. The plate 280 has three rows of tines 310, 311 and 312, and the pivoted plate 282 has two rows of tines 313, 314 to engage the product against which the pusher works. This construction, which allows the selective repositioning of a portion of the pusher plate to either an inclined or co-planer position allows a single pusher to be used where both large products having flat upper portions are used and small products with inclined top surfaces. The construction is extremely sturdy and has the advantage over the other embodiments of providing a firmly positioned and fixed flat plate when desired.

While preferred embodiments of the invention have been described in detail, it will be apparent that various modifications and alterations may be made therein without departing from the spirit and scope of the invention set forth in the appended claims.

I claim:

1. An improved product pusher movable along an upright receptacle that forms part of a magazine for moving a comestible product past a cutter, said pusher comprising a body movable along said receptacle, a surface movable with said body and oriented with respect thereto to extend transversely of the direction of body movement along the receptacle in use, said surface adapted to face an upper end of a comestible product in the receptacle, and a member carried with the surface, at least in part located beneath said surface and movable toward and away from the surface, and means yieldably biasing at least a part of said member to a location spaced from said surface.

2. An improved product pusher movable along an upright receptacle that forms part of a magazine for moving a comestible product past a cutter, said pusher comprising a body movable along said receptacle, means forming surface portions movable with the body and oriented to face an upper end of a comestible product in the receptacle, a first of said surface portions being angularly related to a second of said surface portions, and a member carried with said means adjacent and at least in part spaced from said first surface portion, movable with respect thereto, and yieldably biased to a position essentially in a common plane with said second surface portion.

3. An assembly as set forth in claim 2 including a projection from said first surface portion, and an opening in said member through which said projection extends when the member is moved toward the first surface portion.

4. An improved product pusher movable along an upright receptacle that forms part of a magazine for moving a comestible product past a cutter, said pusher comprising a body movable along said receptacle, means forming surface portions movable with the body and oriented to face an upper end of a comestible product in the receptacle, a first of said surface portions being fixed relative to the body and a second of said surface portions movable with the body and oriented to face an upper end of a comestible product in the receptacle, a first of said surface portions being angularly adjustable relative to the body between positions at least one of which is coplanar with the first surface portion, and retaining means to hold said second surface portion in a selected position relative to the first portion.

5. A pusher as set forth in claim 1, 2, 3 or 4 including means movable with the body to engage the receptacle and prevent downward movement of the body along the receptacle.

6. A pusher as set forth in claim 1, 2, 3 or 4 including means movable with the body to automatically engage the receptacle to prevent downward movement of the body when the pusher is at a predetermined location along the receptacle, said means being manually operable to allow downward movement of the pusher.

7. A pusher as set forth in claim 1, 2, 3 or 4 including a catch movable with the body and engageable with the receptacle to prevent downward movement of the body along the receptacle from a predetermined location, and means to manually operate said catch to allow downward movement.

8. A pusher as set forth in claim 7 wherein said body has a slot for receiving a guide surface that extends along the receptacle, said catch includes at least one element movable between two positions, one of which obstructs the slot, and means biasing the element to the position obstructing the slot, and the means to operate the catch includes hand-operable means for moving the element to a position in which it does not obstruct the slot.

9. A pusher as set forth in claim 7 wherein said body has a slot for receiving a guide surface that extends along the receptacle, said catch includes at least one element movable between two positions, one of which obstructs the slot, and means biasing the element to the position obstructing the slot, and the means to operate the catch includes a pivotable lever carried with the body and acting when pivoted to move the element relative to the body against the biasing means to a position in which the element does not obstruct the slot.

10. A pusher as set forth in claim 4 wherein said retaining means includes an abutment member above and carried with the second surface portion engageable with said body to limit pivoted movement of the second surface portion in one direction, and a movable latch engageable with the member to selectively retain the second surface portion in a co-planar relationship with a first surface portion or in a pivoted, angular, relationship therewith.

11. A pusher as set forth in claim 2 or 3 including means secured to said member, extending between and selectively engageable with said first surface portion, to selectively allow or restrain movement of said member relative to said first surface portion.

12. An improved product pusher movable along a product receptacle for moving a comestible product past a cutter, said pusher comprising a body movable along said receptacle including means to engage the receptacle and guide the body, a surface movable with the body and oriented with respect thereto to extend transversely of the direction of body movement along the receptacle in use, said surface adapted to face an end of a comestible product in the receptacle, a handle secured to and extending from the body in a direction outwardly of the receptacle and transversely of the direction of body movement along the receptacle in use, two spring-biased self-latching catches carried by the body each with a latching portion that engages the receptacle at a predetermined location of the body along the receptacle, and a single finger-operable catch release operable to release both catches simultaneously and located sufficiently close to the handle to permit gripping the handle and releasing the catch with one hand.

13. An improved product pusher movable along a product receptacle for moving a comestible product past a cutter, said pusher comprising a body movable along said receptacle, said body having two spaced parallel guide grooves for slidably receiving guide flanges of the receptacle, two slidable latch members carried by the body, movable through the grooves between latching and releasing positions, spring means biasing the latch members toward the latching positions, a rigid member connected to and between the two latch members and manually movable relative to the body to simultaneously move the latch members relative to the body to release the pusher for movement along the receptacle, a surface movable with the body and oriented with respect thereto to extend transversely of the direction of body movement along the receptacle in use, said surface adapted to face an end of a comestible product in the receptacle, and a handle secured to and extending from the body, at a location that is outside of the receptacle in use.

14. An improved product pusher as set forth in claim 13 further including a pivoted lever carried by one of said body and rigid member so that pivoting of the lever moves the rigid member relative to the body to release the latch members, and wherein the handle is adjacent the lever to allow engagement of the handle and lever simultaneously with one hand.

*15. An improved product pusher movable along a product receptacle for moving a comestible product past a cutter, said pusher comprising a body movable along said receptacle including means to engage the receptacle and guide the body, a surface movable with the body and oriented with respect thereto to extend transversely of the direction of body movement along the receptacle in use, said surface adapted to face an end of a comestible product in the receptacle, a handle secured to and extending from the body in a direction outwardly of the receptacle and transversely of the direction of body movement along the receptacle in use, a spring-biased self-latching catch carried by the body and having a latching portion that engages the receptacle at a predetermined location of the body along the receptacle, and a single finger-operable catch release operable to release said catch and located sufficiently close to the handle to permit gripping the handle and releasing the catch with one hand.*

*16. An improved product pusher movable along a product receptacle for moving a comestible product past a cutter, said pusher comprising a body movable along said receptacle, said body having two spaced parallel guide grooves for slidably receiving guide flanges of the receptacle, a slidable latch member carried by the body and movable between latching and releasing positions, spring means biasing the latch member toward the latching position, actuating means manually movable relative to the body to move the latch member relative to the body and release the pusher for movement along the receptacle, a surface movable with the body and oriented with respect thereto to extend transversely of the direction of body movement along the receptacle in use, said surface adapted to face an end of a comestible product in the receptacle, and a handle secured to and extending from the body, at a location that is outside of the receptacle in use.*

*17. A pusher as set forth in claim 16 wherein said latch member is located sufficiently close to said handle to permit gripping the handle and releasing the latch member with one hand.*

* * * * *